(12) United States Patent
Brook et al.

(10) Patent No.: US 6,188,990 B1
(45) Date of Patent: Feb. 13, 2001

(54) METHOD AND APPARATUS FOR MONITORING THE PROCESSING OF ARTICLES

(75) Inventors: Richard Morley Brook, Huddersfield; Christopher Bernard Bullivant, Chorlton-Cum-Hardy, both of (GB)

(73) Assignee: Autosystems Limited, West Yorkshire (GB)

(*) Notice: Under 35 U.S.C. 154(b), the term of this patent shall be extended for 0 days.

(21) Appl. No.: 09/147,263

(22) PCT Filed: May 13, 1997

(86) PCT No.: PCT/GB97/01280

§ 371 Date: Nov. 13, 1998

§ 102(e) Date: Nov. 13, 1998

(87) PCT Pub. No.: WO97/43726

PCT Pub. Date: Nov. 20, 1997

(30) Foreign Application Priority Data

May 14, 1996 (GB) .................................................. 9610025
Oct. 1, 1996 (GB) .................................................. 9620454

(51) Int. Cl.[7] .................................................. G06F 17/60
(52) U.S. Cl. .................................. 705/28; 705/7; 705/10; 705/30; 702/128; 702/129; 702/179; 702/180; 702/181; 702/188
(58) Field of Search .............................. 283/55; 705/28, 705/29, 7, 10; 700/108, 109; 702/179, 180, 181, 188, 128, 129

(56) References Cited

U.S. PATENT DOCUMENTS

| | | | |
|---|---|---|---|
| Re. 36,360 | * 10/1999 | Costanza | 705/8 |
| 4,398,613 | * 8/1983 | Hirano | 177/25.19 |
| 4,519,042 | * 5/1985 | Minamida et al. | 700/305 |

(List continued on next page.)

FOREIGN PATENT DOCUMENTS

| | | | |
|---|---|---|---|
| 0 319 442 A2 | * | 6/1989 | (EP) . |
| 0 323 383 A2 | * | 7/1989 | (EP) . |
| 2 265 032 | * | 9/1993 | (GB) . |

OTHER PUBLICATIONS

IBM Technical Disclosure Bulletin, vol. 26, No. 12, p. 6668, "Change of Chart Types with the Same Data Structure," May, 1984.*

Small, G.J. "Measuring the quality of seafood products: using microcomputers and statistical process control in the seafood industry," in "Quality control and quality assurance for seafood: proceedings of a conference," edited by Sylvia, Shriver, and Morrissey, 1994.*

*Primary Examiner*—James P. Trammell
*Assistant Examiner*—Nicholas David Rosen
(74) *Attorney, Agent, or Firm*—Arent Fox Kintner Plotkin & Kahn PLLC (57) ABSTRACT

A method and apparatus is provided for monitoring the processing of a group of articles having different properties, for example differing weights and/or quality grades. The method includes the steps of obtaining information about the differing properties of the group, using this information to provide a main visual model of the property distribution within the group, and providing a first subsidiary visual model relating to the processing of a first sub-group of articles from within the group, the provision of the first subsidiary model causing a modified form of the main visual model to appear, related to the remaining articles of the group after removal of the articles forming the first sub-group. The method is particularly effective for use in monitoring the processing of poultry carcasses being conveyed in succession along a path, for sorting by weight and grade of carcass. The method may be used in advance of processing, to run a test as to what might happen during processing according to different parameters, and it can also be used during actual processing, to monitor what is actually happening, against a target time, numbers and maximum processing capacities.

21 Claims, 10 Drawing Sheets

U.S. PATENT DOCUMENTS

| | | | |
|---|---|---|---|
| 4,549,278 | * 10/1985 | Minamida et al. | 700/305 |
| 4,642,788 | * 2/1987 | Haze | 700/305 |
| 4,917,198 | * 4/1990 | Sing | 177/25.14 |
| 4,961,533 | * 10/1990 | Teller et al. | 177/25.19 |
| 4,967,928 | * 11/1990 | Carter | 221/2 |
| 5,028,766 | * 7/1991 | Shah | 235/381 |
| 5,375,062 | * 12/1994 | Aoki | 700/99 |
| 5,440,478 | * 8/1995 | Fisher et al. | 700/109 |
| 5,478,990 | * 12/1995 | Montanari | 235/375 |
| 5,526,437 | * 6/1996 | West | 382/141 |
| 5,797,129 | * 8/1998 | Rohan | 705/8 |
| 5,963,919 | * 10/1999 | Brinkley et al. | 705/28 |
| 5,970,465 | * 10/1999 | Dietrich et al. | 705/7 |
| 6,029,140 | * 2/2000 | Martin et al. | 705/11 |

* cited by examiner

ABILITY OF FLOCKS TO SATISFY KEY ORDERS

27th September 1996

| Product Descrip | Comp by (Time) | Max Rate bpm | Flock Reference Time to process | | A 56 min | B 63 min | C 56 min | D 69 min | E 44 min | F 56 min | G 63 min | H 75 min |
|---|---|---|---|---|---|---|---|---|---|---|---|---|
| | | | Total Planned | | Max possible at given rate / Rest in flock available for each order | | | | | | | |
| Tesco 11 Std | 15:00 | 20 | 2000 | | 1125 / 0 | 1204 / 0 | 585 / 0 | 1375 / 550 | 560 / 0 | 135 / 0 | 1250 / 150 | 1440 / 0 |
| Sainsbury Size 3 | 15:00 | 20 | 3000 | | 1125 / 450 | 1250 / 166 | 1125 / 225 | 1375 / 605 | 875 / 0 | 540 / 0 | 1250 / 350 | 780 / 0 |
| M & S Small | 15:00 | 20 | 1000 | | 1125 / 180 | 1227 / 0 | 1017 / 0 | 1375 / 418 | 714 / 0 | 378 / 0 | 1250 / 140 | 864 / 0 |

33 — Tesco 11 Std
34 — Sainsbury Size 3
35 — M & S Small

Day Plan | Flock Plan | Schedule | Orders | Products | Capacities

FACTORY PRODUCTION CAPACITIES

| Production Periods | | | | Processing Capacities | | |
|---|---|---|---|---|---|---|
| Start of production | | | 7:30 | Kill/Ev | 9000 | birds per hour |
| Morning break | 10:00 | to | 10:15 | Chill | 28 | tonnes per hour |
| Lunch break | 12:15 | to | 13:00 | Truss | 1450 | birds per hour |
| Afternoon break | 15:00 | to | 15:15 | Mature | 15 | tonnes per hour |
| | | | | Cut | 4000 | birds per hour |
| | | | | Cook | 550 | kg per hour |
| Day Plan | Flock Plan | | | Capacities | Abilities | Orders | 50000 birds maximum | Products |

FIG. 10

METHOD AND APPARATUS FOR MONITORING THE PROCESSING OF ARTICLES

The invention relates to a method of monitoring the processing of a group of articles, the articles of the group having differing properties, for example having differing weights and/or differing quality grades.

The method and apparatus have been developed for use in monitoring the processing of poultry carcasses being conveyed in succession along a path, for sorting by weight and grade of carcass, and one example of a processing apparatus with which the method and apparatus of the present invention could be used is disclosed in GB-1,603,860. However, the method and apparatus are not restricted in their use to poultry carcass processing systems and could have useful application in the processing of many different types of article. Other types of food article may include lamb or pork.

The invention has been developed because the processing of poultry carcasses presents many problems. Any given flock of birds to be processed will not be absolutely identical to the previous flock and there will be many variations without the group as to weight and quality of carcass.

Furthermore, the way in which a given flock is to be processed will vary from day to day, and may vary during a day. One reason for this is that customer requirements vary and one customer may require a first number of carcasses within one weight range, and a different customer may require a different number of carcasses lying within a different weight range. These weight ranges may overlap. Some orders will have a higher priority than others and trying to ensure that the varying demands are matched with the supply provided by a given flock is very difficult.

The invention provides a method of monitoring the processing of a group of articles having differing properties, for example having differing weights and/or quality grades, the method comprising the steps of obtaining information about the differing properties of the group, using this information to provide a main visual model of the property distribution within the group, and providing a first subsidiary visual model relating to the processing of a first sub-group of articles from within the group, the provision of the first subsidiary model causing a modified form of the main visual model to appear, related to the remaining articles of the group after removal of the articles forming the first subgroup.

The method may be used in advance of processing, to run a test as to what might happen during processing according to different parameters, and it can also be used during actual processing, to monitor what is actually happening, against target time, numbers and maximum processing capacities. The method could also be used after processing, to review what did happen.

The first step may be achieved by using known statistical data relating to the relevant group, by random sampling of the actual group, or in any other desired manner. For example, given flocks of birds from a given farm may have weight distributions and quality distributions which are fairly consistent, and so a reasonably reliable databank of statistics may be built up and used.

Preferably the method comprises the step of providing at least a second subsidiary visual model relating to the process of a second sub-group of articles from within the group, the provision of the second subsidiary model causing a second modified form of the main visual model to appear, related to the remaining articles of the group after removal of the articles from the first and second sub-groups.

Preferably the first sub-group of articles will relate to the highest demand priority.

The method enables a series of demand parameters to be worked through, in order of priority, and after each demand priority has been selected, the user of the method has a visual indication of the property profile of the remaining articles, to assist in selecting subsequent demands of lower priority.

The main visual model may comprise a graph.

The graph may for example be a line graph or a bar graph.

Alternatively, or in addition, a numerical visual model may be provided.

Preferably the or each modified form of the visual model is numerical.

The method may be such that the main visual model remains in view, in addition to the modified forms of the main visual model.

The, or each, subsidiary visual model relating to the processing of a sub-group of articles may comprise a band width spanning the desired range of properties.

For example, the properties may be represented as weight bands, the preselected band width comprising a visual indicator extending across the optimum desired weight band.

The indicator may comprise a horizontal bar.

The indicator may be extendable at one or both ends, when it is permissible to fill a given demand with articles which vary slightly from the optimum, when insufficient articles having the optimum property are available.

When, in a practical situation, a given form of processing within the group has to be changed or stopped, the method may include highlighting the relevant visual indicator to warn the user what is happening.

Where the indicator comprises a horizontal bar, the nature of the bar may change when processing is altered or stopped.

For example a solid bar may be used in normal conditions, with the bar becoming hollow when processing changes or stops.

When one form of processing within the group is changed or stopped, this can have a dramatic effect on further processing downstream. For example too many articles may suddenly reach a given processing point causing jamming or other difficulties.

The method may include means to provide a visual model of the consequent effect of changing or stopping one aspect of the processing.

For example the method may cause a visual model to be created showing articles rapidly bunching up and jamming.

The method may be such that a visual model can be provided of what is happening at certain particular processing points. For example, where the method is being used to monitor the processing of poultry carcasses, linked with an apparatus such as that shown in GB-1,603,860, it may be possible to monitor what is happening at each individual carcass drop-off point.

The method defined above is particularly effective in monitoring the processing of poultry carcasses being conveyed in succession along a path.

The carcasses being processed during any given time period, for example one day, may well be drawn from several different flocks of birds being delivered to a poultry processing plant during that time period.

We have appreciated that by controlling the order in which flocks are processed, independence on processing requirements during the time period, processing efficiency can be improved and the likelihood of processing problems occurring can be reduced.

Accordingly, a preferred aspect of the method according to the invention comprises obtaining information about sub-groups of articles being received for processing, comparing this information with processing steps to be carried out, and using this comparison to select the order in which sub-groups are processed.

The invention includes apparatus for carrying out the method of the invention.

The apparatus may comprise an appropriately programmed computer and a visual display unit on which the visual models appear.

The computer, and the visual display unit, may be a stand alone system, or it may be part of the overall computer system which controls and operates the processing equipment.

Figure 1:
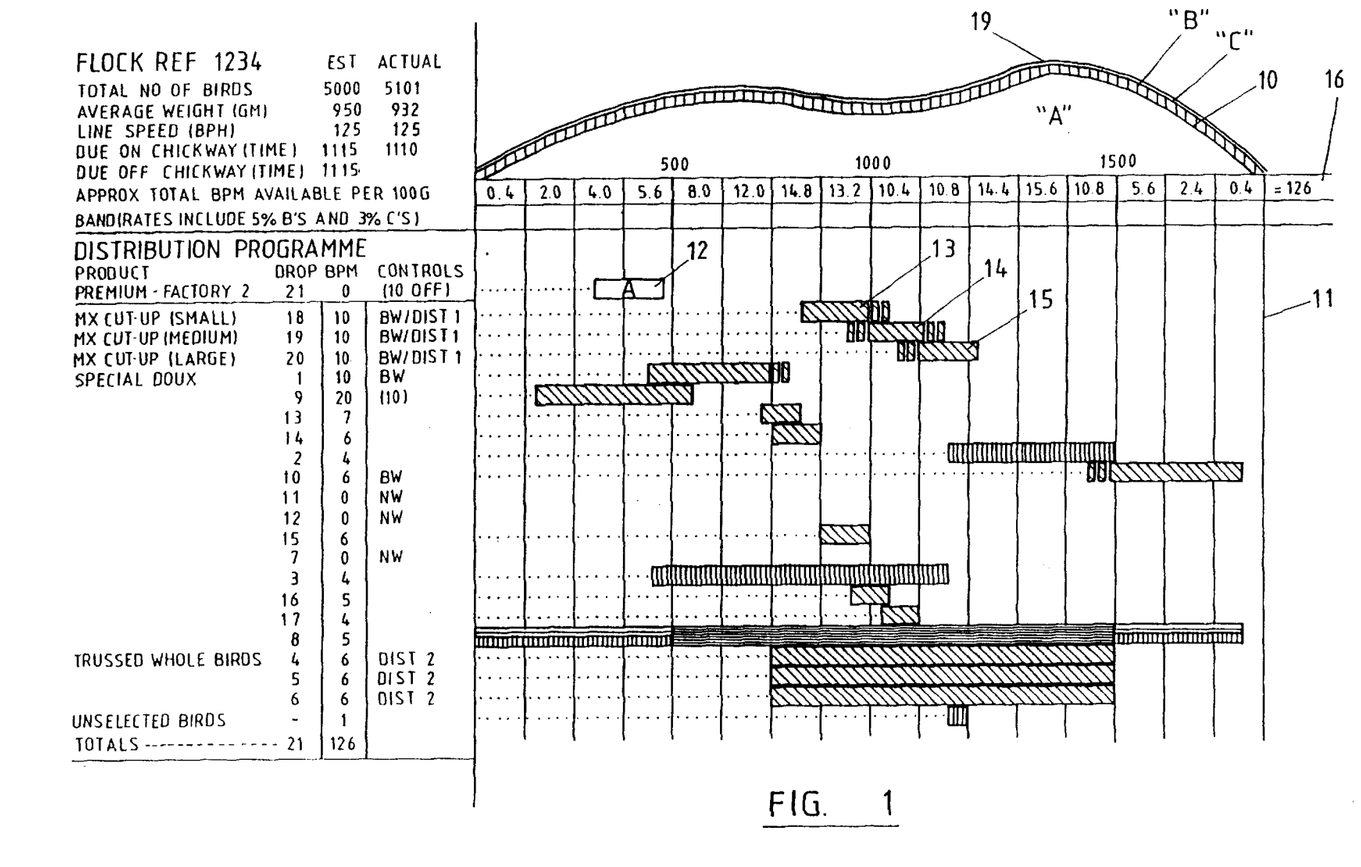
FIG. 1 is a diagrammatic representation of one visual model prepared according to the method of the invention, after all the supply and demand parameters have been applied.

By way of example, a specific embodiment of the invention will now be described, with reference to the accompanying drawings, in which:

FIG. 1 illustrates an embodiment of visual model for use in planning and monitoring the processing of articles using a conveyor system such as that disclosed in GB-1,603,860, the contents of which are incorporated herein by reference.

The method according to this embodiment is related to the sorting of a plurality of poultry carcasses by weight and grade.

A particular flock of birds will be sorted and processed according to the requirements of various customers. Requirements on products to be produced from the same flock may include carcasses graded as small, medium and large, and these carcasses may be required whole or cut up into pieces.

FIG. 1 represents the screen of a visual display unit and at the start of the method a visual profile of the weight properties of the flock is entered at the top of the screen and is represented by the graphical line 10.

Below this graphical line 10, the screen is divided up into any desired weight bands by vertical lines 11.

Projected demands are entered on the screen using horizontal bands such as 12. In this example the band 12 represents the demand of highest priority where no deviation from the preset parameters is permitted. With some lower priority demands, such as 13, 14 and 15, some deviation may be permitted if there are insufficient birds having the desired weight parameters to fill the main criteria. It will be seen for example that band 13 comprises one long band and two smaller bands at one end of the long band. This indicates that if necessary the band can be extended at one end. The band 14 can be extended at both ends.

Figure 2:
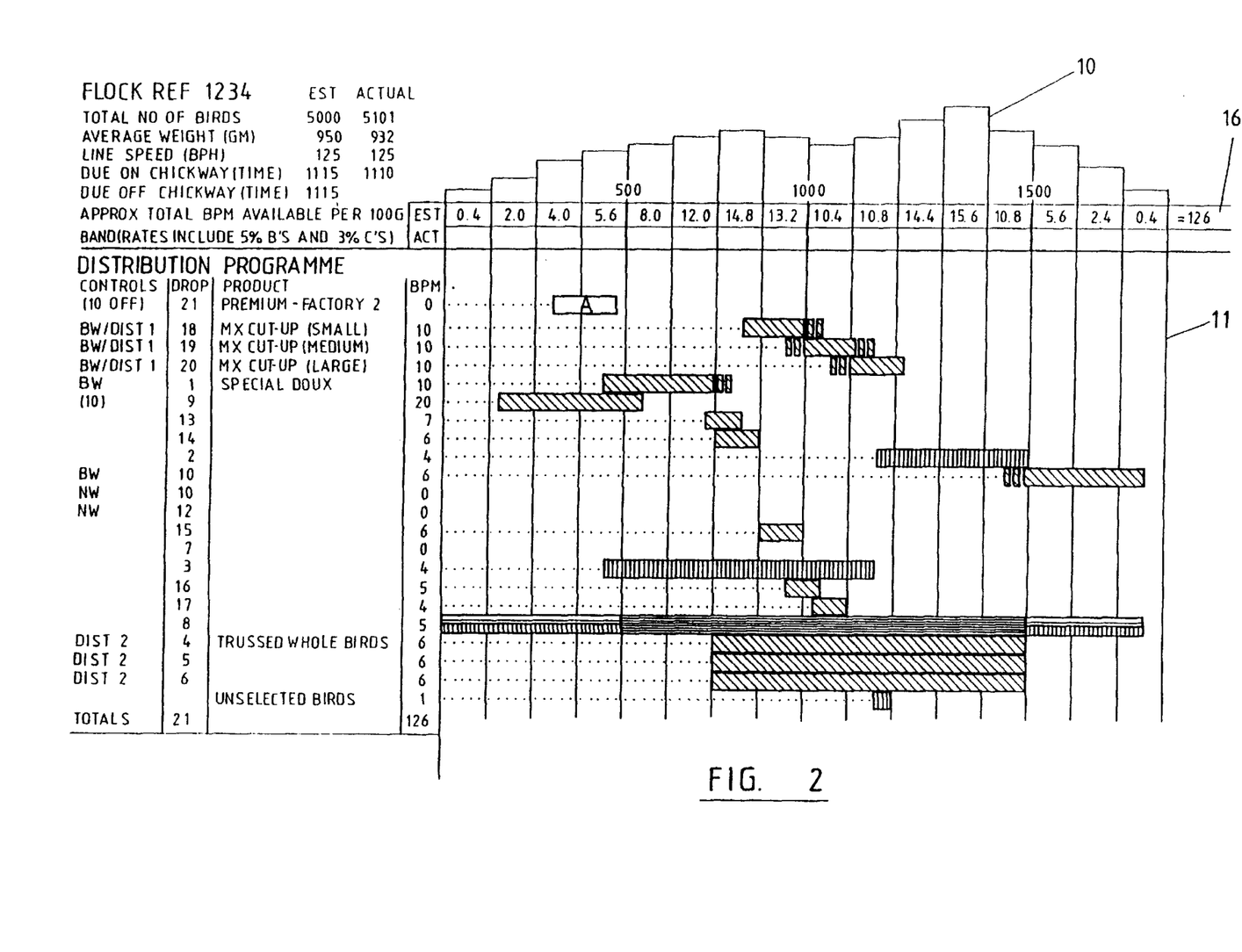
FIG. 2 is a view similar to FIG. 1 but showing a variation in the form of visual display.

FIG. 2 shows an almost identical arrangement except that the supply graph 10 is represented as a bar graph, rather than a line graph.

In addition to the graphical representations of FIGS. 1 and 2, with regard to supply, the information is also represented numerically by a line of figures 16 immediately below the graph. It is not essential that the information be represented both graphically and numerically and in the embodiment of FIG. 3, the information is purely numerical.

Figure 3:
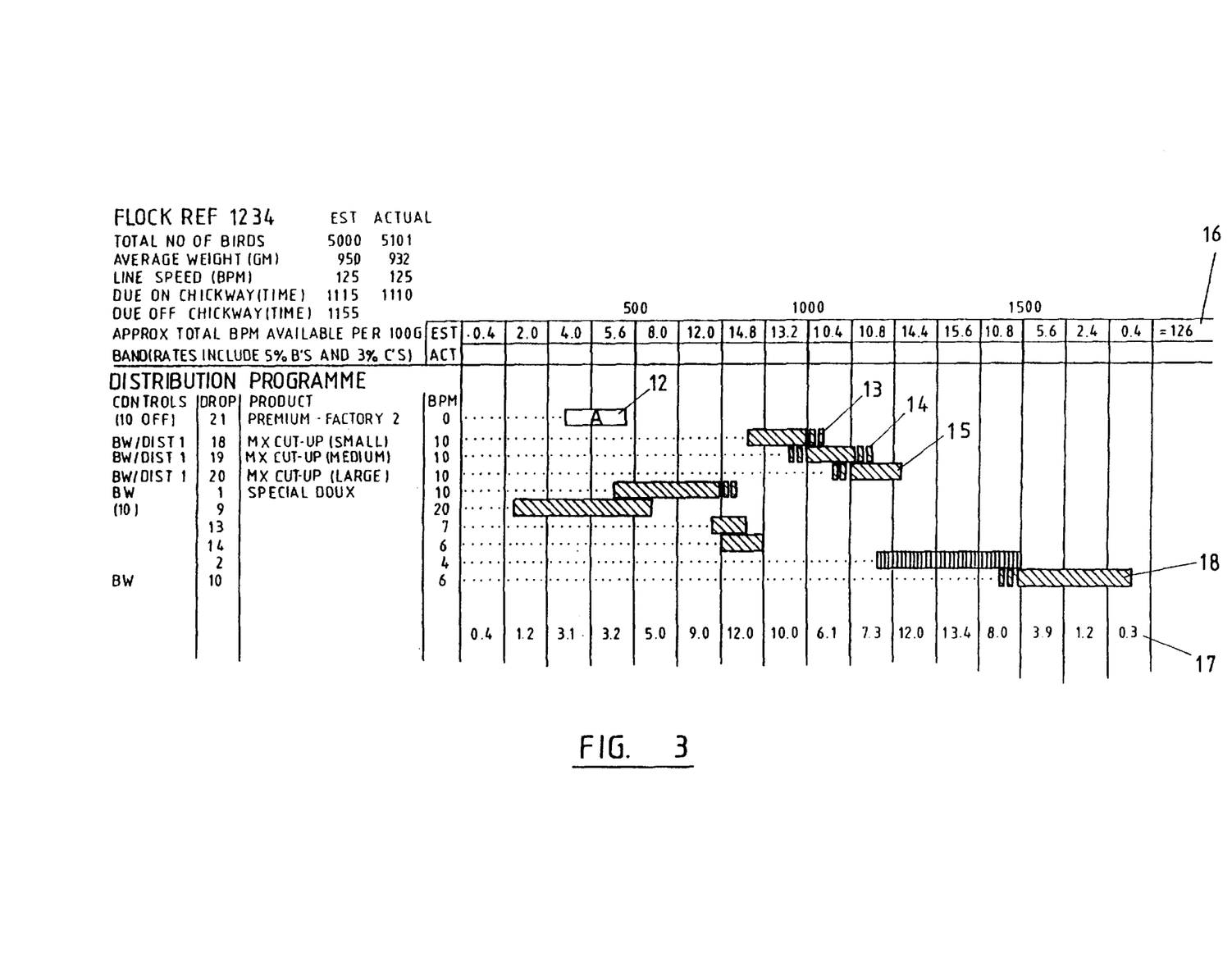
FIG. 3 is a variation of the embodiment shown in FIG. 2, part way through the process of monitoring the supply and demand.

FIG. 3 also illustrates how the method is used to set up a complete visual representation of, for example, a whole day's production.

The band 12 representing the highest priority is entered first and this causes the numerical figures of line 16 to be re-calculated to represent the remaining supply, and these figures appear on the screen immediately below band A. As the successive bands 13, 14, 15 and so on are entered on the screen, the remaining supply figures are re-calculated each time and reappear below the latest priority that has been entered.

In FIG. 3 about half the screen has been completed and the re-calculated figures appear at line 17 immediately below the last entered band, shown at 18.

The method enables an operator who was planning the day's production to see at each stage the details of the remaining supply to enable the operator to assess the ability to meet the demand of next priority.

The method may be adapted to deal also with the supply and demand of carcasses of a specific grade and in FIG. 1 the upper graph line 19 provides a visual representation of grade supply.

On occasions, it becomes necessary to shut down part of a processing line, for example because of a malfunction at a particular operating station. The method according to the invention enables the operator to receive a visual indication that this has happened. In this embodiment, the cessation of an operation is indicated by the relevant band becoming hollow, rather than solid, as indicated by the band 12 in FIG. 1.

It will thus be seen that the method and apparatus according to the invention provide much improved planning and control, including real time monitoring and reporting.

Many variations are possible. While the method has been described in relation to continuous path processing, with reference to GB-1 603 860, the processing may also occur on a conveying system having branch lines. This may be particularly applicable to the processing of lamb or pork, where portions of meat may be conveyed into sidings for subsequent processing.

While the method has been described by way of example in relation to a day's production, other time periods may of course be selected, to cover one or more hours, or specific shifts.

The method according to the invention enables many different parameters to be utilised, and the method can cope with information about flock or group profile provided from an agricultural department, from previous processing information, or from actual sampling, for example by weighing lambs and pigs. Information about order consolidation and modifications thereto may be received from a sales or planning department. Information about product specification may be received from a factory database and information about target times may be received from a shipping department. The method according to the invention substantially simplifies planning an operation, and makes it easier to fill the highest priority orders, while at the same time endeavouring to ensure that each production unit on a processing line is used to its capacity for maximum efficiency.

In a poultry processing factory, flocks of birds are being delivered to the factory for subsequent processing on a substantially continuous basis. No two flocks will be identical and some flocks may be better suited for fulfilling certain product order requirements than others.

During any given time period, for example one day, there will be certain key orders that must be fulfilled for major customers. The remaining orders may be less important or more flexible in their requirements.

We have further developed the visual modelling method described above so that a user of our method can optimise the chances of satisfying key customer orders, while maximizing profitability and reducing the risk that unforeseen problems will occur during processing.

The method involves sophisticated advance production planning including a study of the flocks to be processed during a given time period, and selecting the optimum order in which to process the flocks on the day of production.

The method examines raw material profiles, critical product requirements, and further processing capacity. Comparisons are then used to send birds to the most appropriate destination, including sending them to cutting regions, further processing, packing and the like.

The preferred embodiment will now be described in detail with reference to FIGS. 4 to 10.

Figure 4:
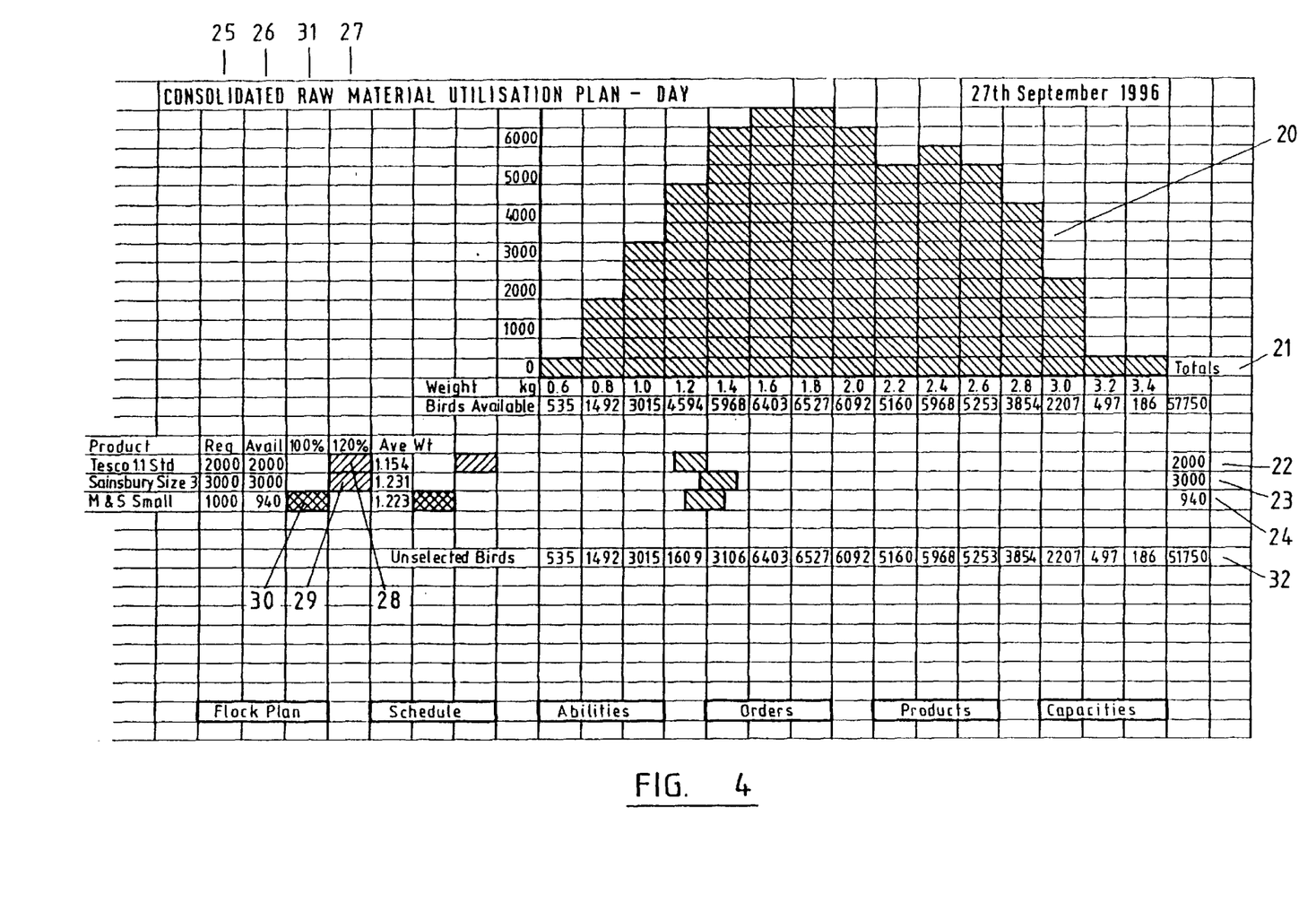
FIG. 4 is a visual model for use in a manner similar to FIG. 2, but with the preferred embodiment of the invention.

FIG. 4 provides information generally similar to FIG. 2. Thus there is a graph 20 representing the consolidated raw material, from all flocks, during the given time period, including, in line 21, the number of birds available in certain weight bands.

Below the graph 20, the requirements of key orders for that time period are listed, on lines 22, 23 and 24.

Column 25 lists the numerical requirements for each order and column 26 lists the birds available.

In this example, the availability exactly matches the requirements for the first two orders in lines 22 and 23. This suggests a potential problem because there is no flexibility, and so column 27 provides a visual warning in the form of the lightly shaded boxes 28, 29.

With the third order, in line 24, there is insufficient capacity and so there is definitely going to be a problem, unless the utilised plans are changed. This warning is indicated by the darkly shaded box 30 in column 31.

Line 32 provides the modified visual model relating to the remaining birds of the group, after removal of the birds needed to fulfil the key orders.

Figure 5:
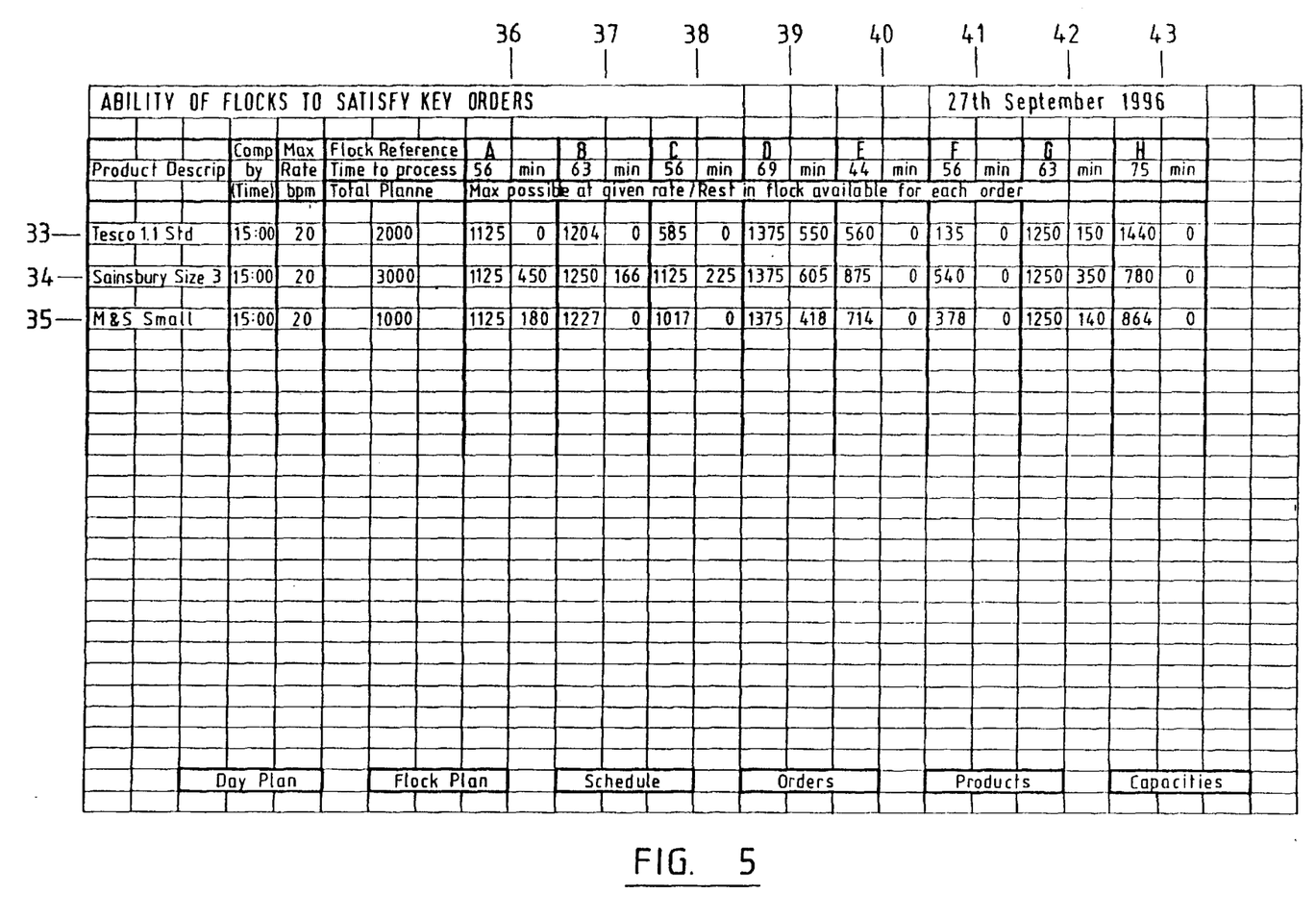
FIG. 5 is a visual model relating to different sub-groups each comprising a different flock to be processed, and showing the ability of the flocks to satisfy key orders in a given time period.

To assist in changing the production schedule, during the pre-planning stage, to avoid or reduce potential problems highlighted on the initial visual models, arrangements are made to show on-screen the ability of flocks to satisfy key orders and an example of such a screen is shown in FIG. 5.

The key order requirements are listed in lines 33, 34 and 35 and information about eight different flocks, A to H, is given in columns 36 to 43.

Figure 6:
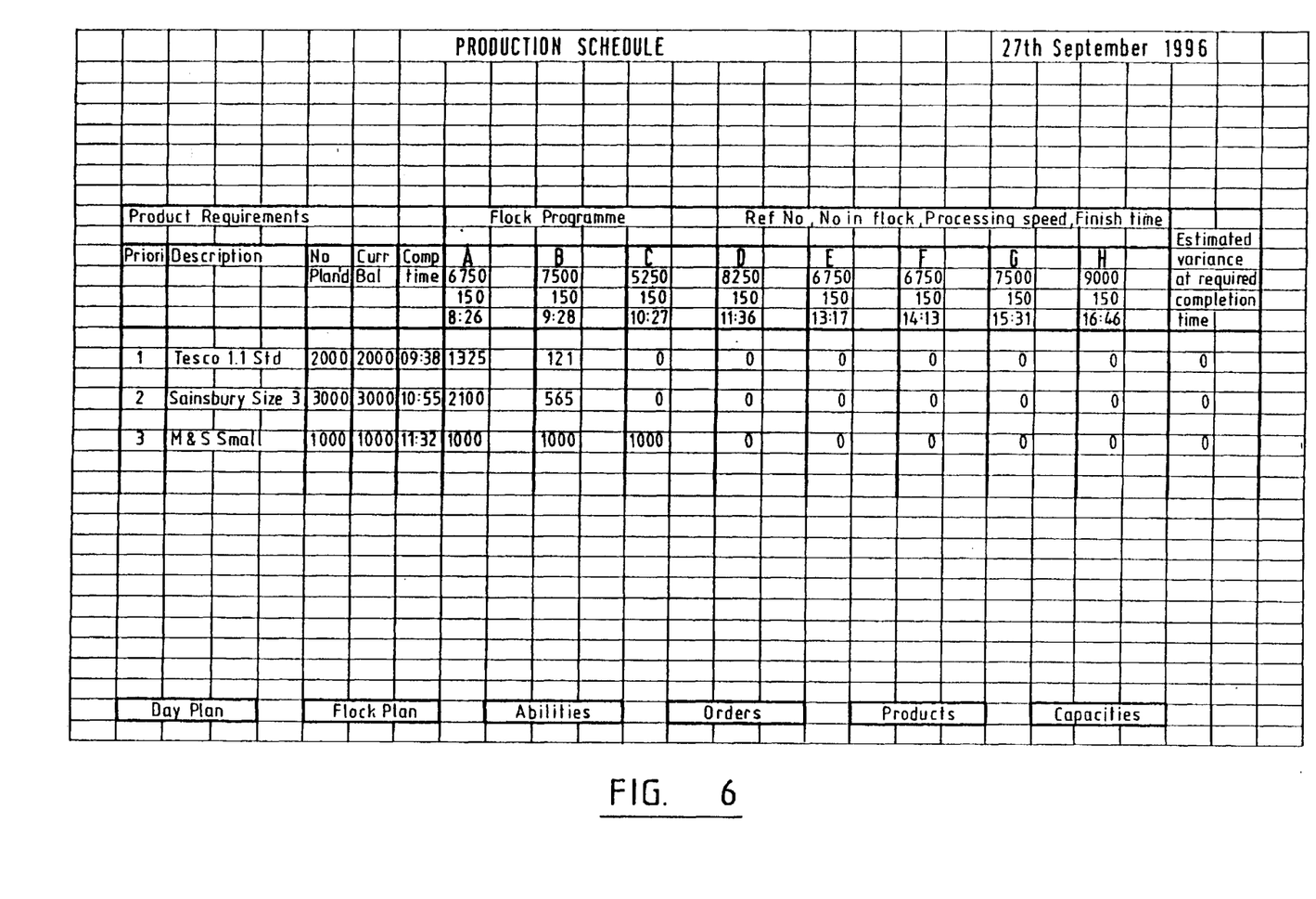
FIG. 6 is a visual model representing a planned production schedule, showing the key orders to be filled together with information about the different flocks.
Figure 7:
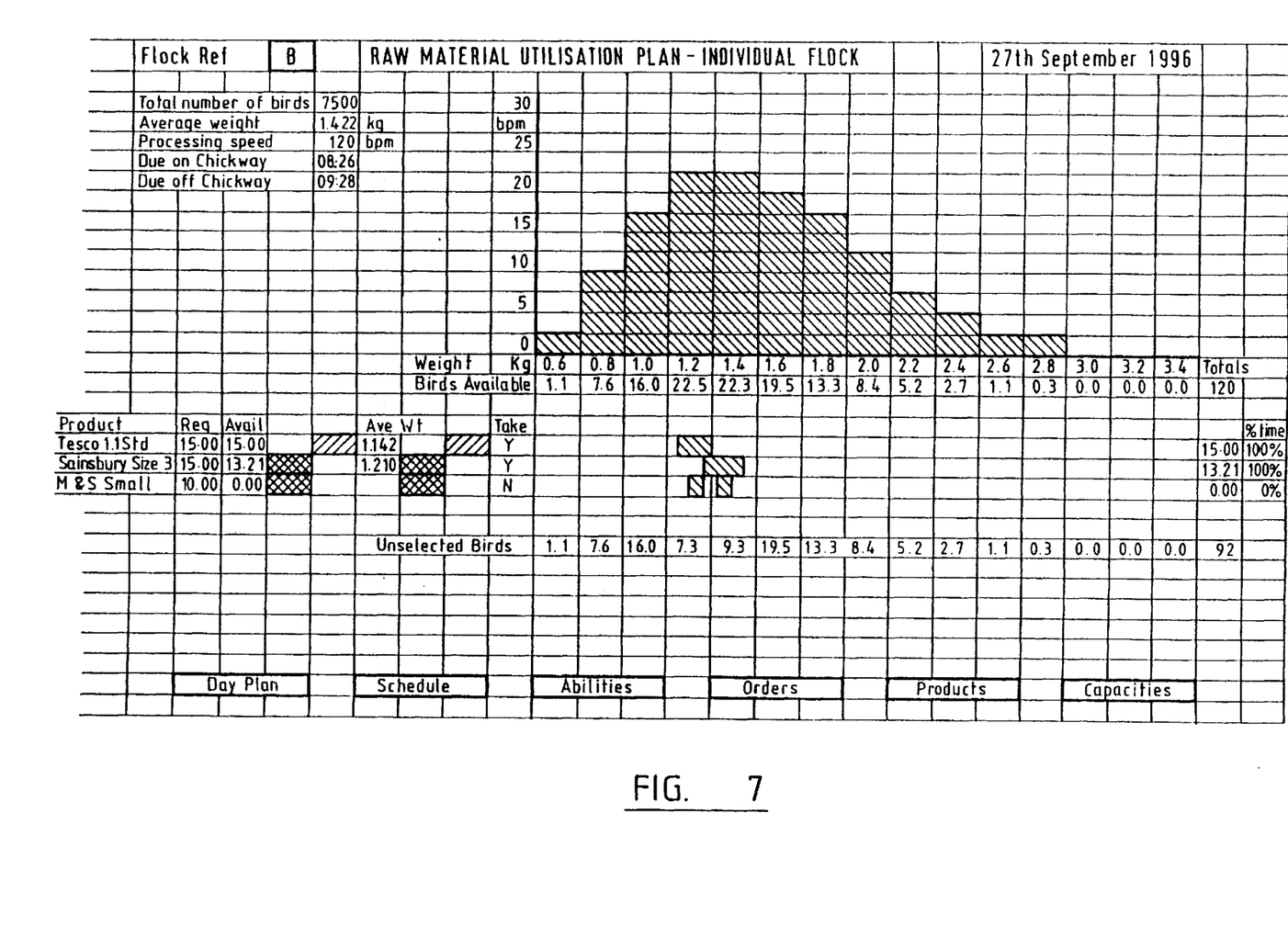
FIG. 7 is a visual model showing what would happen if one identified flock is utilised to supply the key orders.
Figure 8:
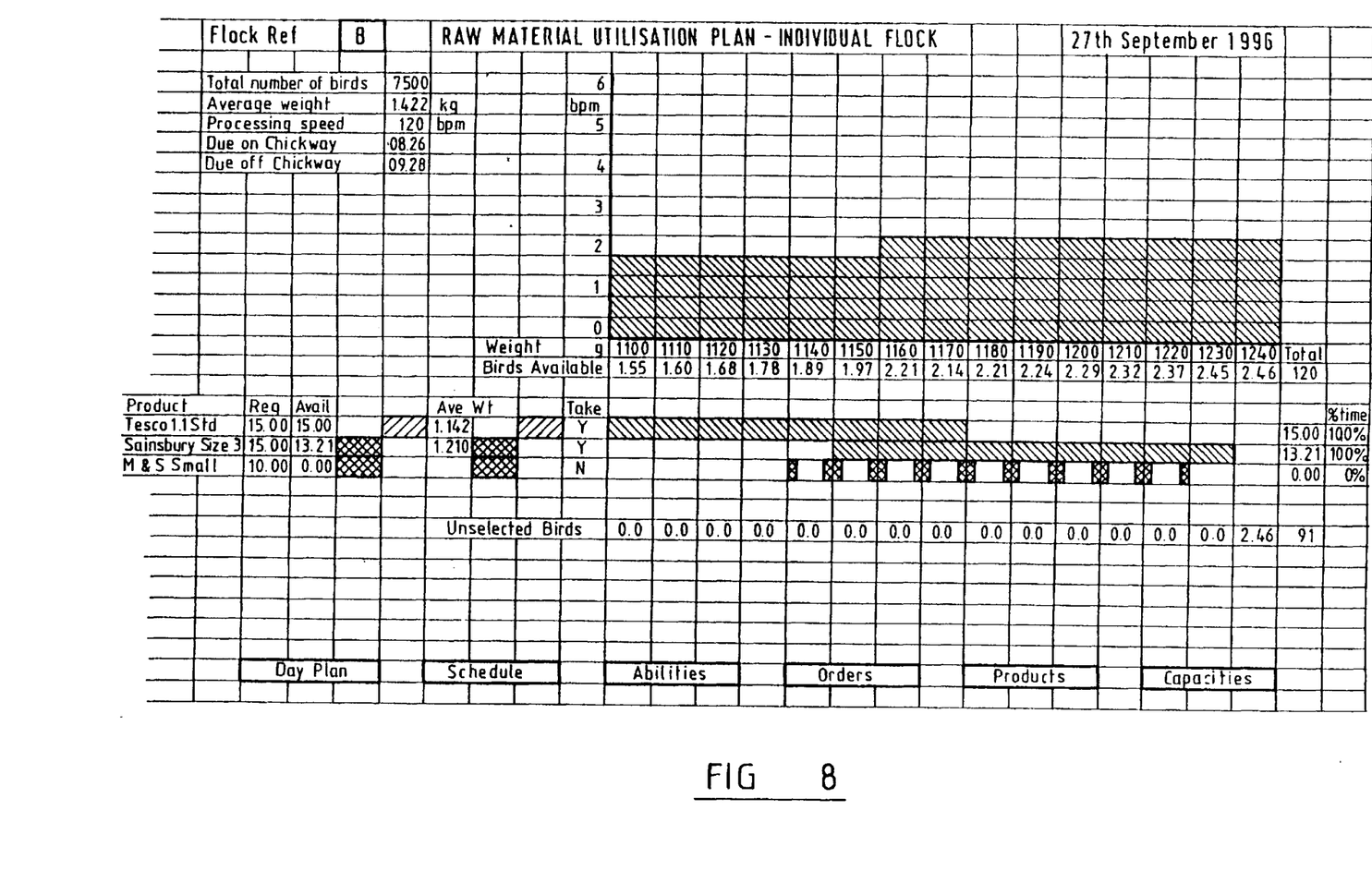
FIG. 8 is a view similar to FIG. 7 but zooming in on a specific part of the flock profile.
Figure 9:
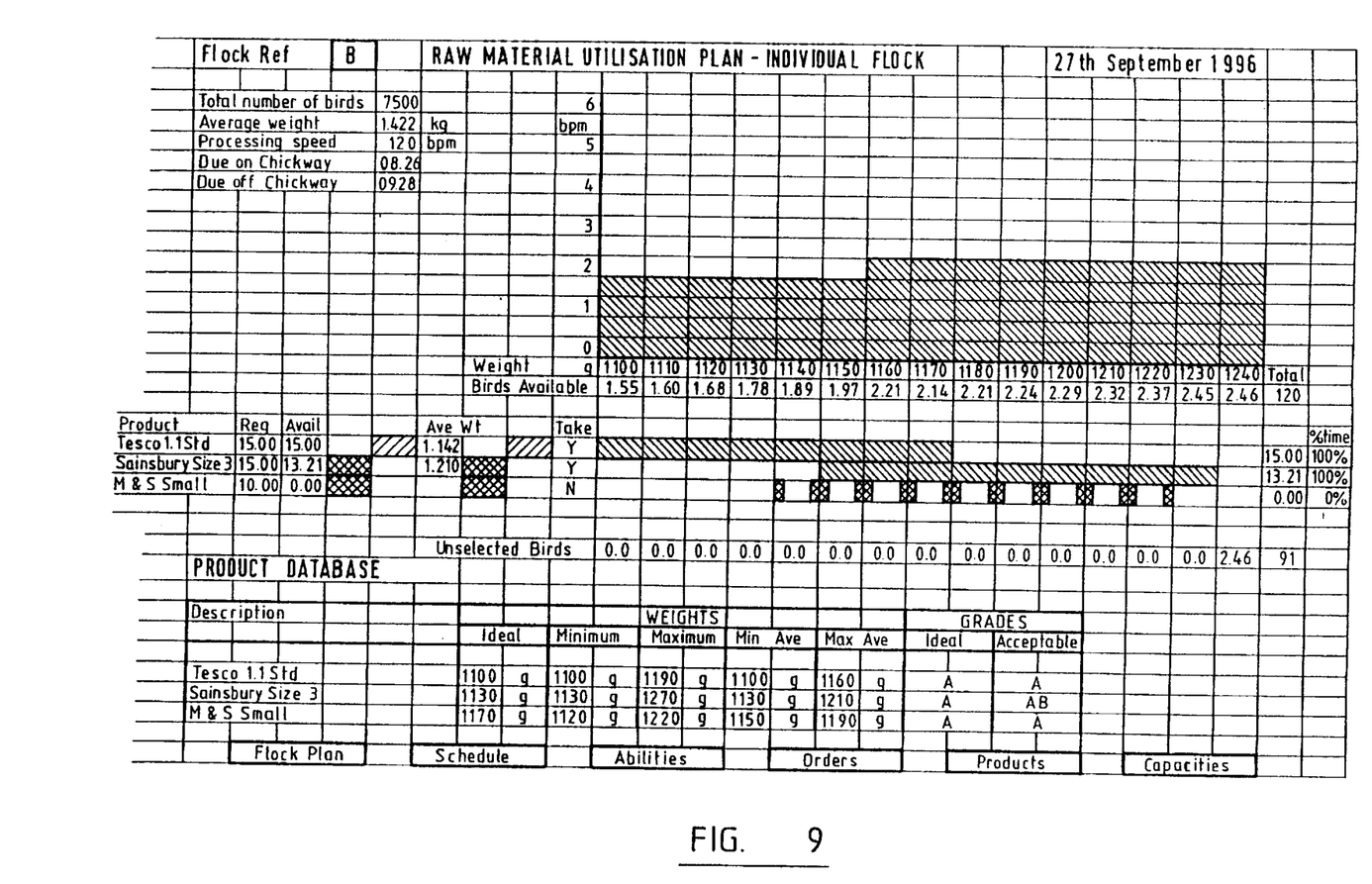
FIG. 9 is a view similar to FIG. 8, but showing on the same screen information about requirements of the key orders.
Figure 10:
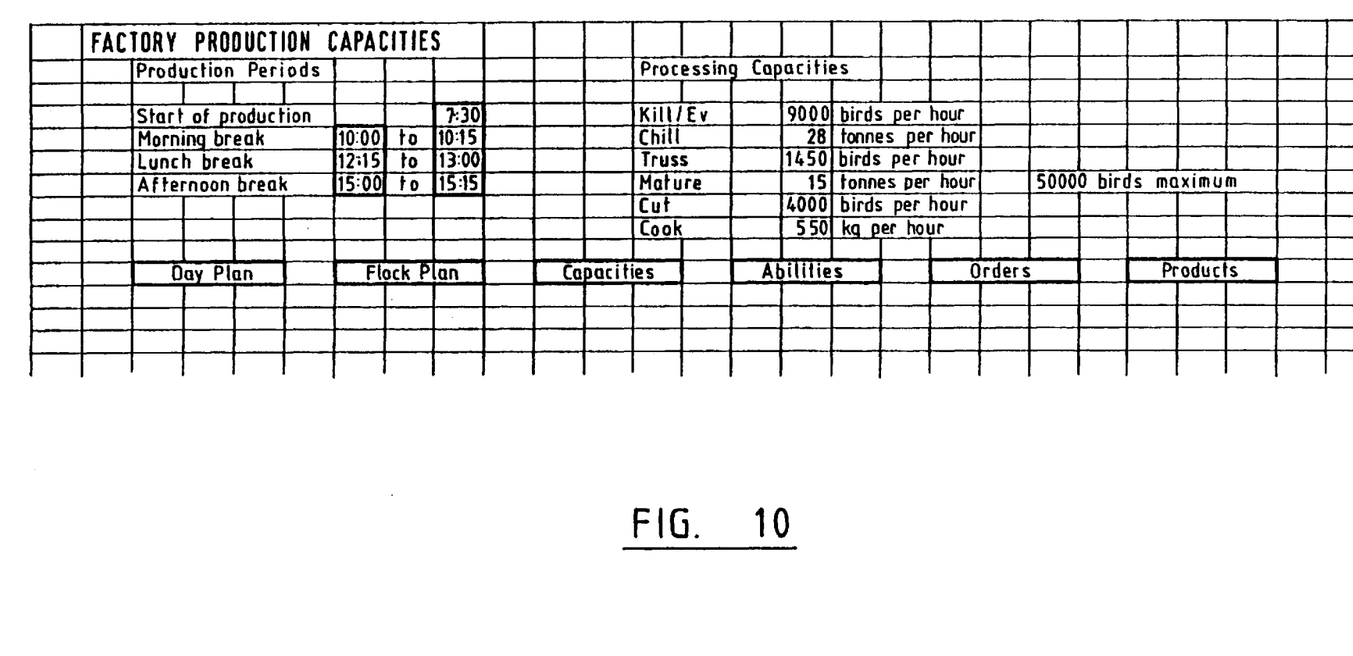
FIG. 10 is a view showing that factory production capacities can also be brought up on the same screen so that a check can be made that the desired products and order requirements are within the production capacities.

Information about the abilities to utilize individual flocks can be obtained, for example using the screen shown in FIG. 7, 8 and 9, and an analysis of these utilization capabilities enables the production manager or planner to revise the plan production schedule for a particular time period, for example by changing the order in which flocks will be processed. Such a modified production schedule is shown in FIG. 6, where the production periods for flocks C and E have been swopped around.

All the necessary data and software can be loaded onto to common databases within the factory, with the information provided on a plurality of screens.

There may for example be a forward planning module available to the production manager or planner, a production schedule module available to the production supervisor, with certain on-screen information available to line supervisors and operatives on the shop floor, for information only or with a strictly limited degree of control.

A typical operational sequence will now be described.

A Forward Planning

This takes place well in advance of the related production day (referred to as D-day in this example). It is based on a set of assumptions which are refined as more data becomes available.

The flocks planned for D-day are combined into one profile, for example as in FIG. 4.

A demand picture for D-day is built up, starting with the highest priority demand.

Birds remaining are then calculated, for example as in line 32 of FIG. 4, and shortages are noted. At this stage reports may be made to sales/purchasing departments where necessary.

It is also possible to carry out "what if" analyses using a selection of the screens shown in the figures.

B. Production Scheduling

This can involve pre-planning over a period of days prior to D-day and the pre-planning may for example take place over a seven day period, taking into account production targets, the time at which targets are reached, and production capacities.

During this time the forward plan will be fine tuned, requirements for supply and demand will be up-dated, and balances will be re-calculated.

Eventually a provisional production schedule is initiated, by shuffling flocks (where possible) into the best order to satisfy early priorities, producing a series of plans (per flock) based on rates, to check balance, and using plans to automatically generate processing settings for each flock.

C. Interaction Between A and B

This takes place on a flock by flock basis, with shaded portions on the screens highlighting mismatches, which enables corrective action to be taken before a problem occurs. Data may also be released at this stage from the production manager/planners level to the production supervisors level, for example on the day before D-day.

D. D-day

On the actual day of production, fine tuning can take place at the production supervisors level, local line controls may be made at the line supervisor/operative level on the shop floor, but unexpected major variances can also be handled at the production manager/planner level.

For example at the production supervisor level the production schedule visual model is used to monitor production against targets and if necessary to make short term corrections.

The forwarding planning visual model highlights the knock on effects of any major changes to supply or demand. This enables managers to decide their own degree of intervention when the system highlights variances.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of monitoring the processing of a group of articles having different properties, the method comprising the steps of:

obtaining information about the differing properties of the group;

using this information to provide a main visual model of the property distribution within the group; and providing a first subsidiary visual model relating to the processing of a first sub-group of articles from within the group which comprises a band width spanning a desired range of properties, the provision of the first subsidiary model causing a modified form of the main visual model to appear, related to the remaining articles of the group after removal of the articles forming the first sub-group.

2. A method as claimed in claim 1, in which the step of obtaining information about the differing properties of the group is achieved by using statistical data relating to the relevant group, or by random sampling of the actual group.

3. A method as claimed in claim 1, further comprising the step of providing at least a second subsidiary visual model relating to the process of a second sub-group of articles from within the group, the provision of the second subsidiary model causing a second modified form of the main visual model to appear, related to the remaining articles of the group after removal of the articles from the first and second sub-groups.

4. A method as claimed in claim 3, in which the first sub-group of articles relates to the highest demand priority.

5. A method as claimed in claim 1, in which the main visual model comprises a graph.

6. A method as claimed in claim 1, in which said modified form of the visual model is numerical.

7. A method as claimed in claim 1, such that the main visual model remains in view, in addition to a modified form of the visual model.

8. A method as claimed in claim 1, in which the properties are represented as weight bands, a preselected band width comprising a visual indicator extending across an optimum desired weight band.

9. A method as claimed in claim 8, in which the indicator is displayed as a horizontal bar.

10. A method as claimed in claim 9, in which the indicator is extendable at one or both ends, when it is permissible to fill a given demand with articles which vary slightly from the optimum, when insufficient articles having the optimum property are available.

11. A method as claimed in claim 9, in which when, in a practical situation, a given form of processing within the group has to be changed or stopped, the method includes highlighting the relevant visual indicator to warn the user what is happening.

12. A method as claimed in claim 9, in which the indicator comprises a horizontal bar, and the nature of the bar changes when processing is altered or stopped.

13. A method as claimed in claim 12, in which a solid bar is used for normal conditions, the bar becoming hollow when processing changes or stops.

14. A method as claimed in claim 1, further including the step of providing a visual model of the consequent effect of changing or stopping an aspect of the processing.

15. A method as claimed in claim 14, the step of creating a visual model showing articles rapidly bunching up and/or jamming.

16. A method as claimed in claim 1, such that a visual model is provided of what is happening at certain particular processing points.

17. A method as claimed in claim 1, further comprising obtaining information about sub-groups of articles being received for processing, comparing this information with processing steps to be carried out, and using this comparison to select the order in which sub-groups are processed.

18. An apparatus for monitoring the processing of a group of articles having differing properties, said apparatus comprising:

means for obtaining information about differing properties of the group;

means for using this information to provide a main visual model of the property distribution within the group; and means for providing a first subsidiary visual model relating to the processing of a first sub-group of articles from within the group which comprises a band width spanning a desired range of properties, a provision of the first subsidiary model causing a modified form of the main visual model to appear, related to the remaining articles of the group after removal of the articles forming the first sub-group.

19. The apparatus as claimed in claim 18, comprising an appropriately programmed computer and a visual display unit on which the visual models appear.

20. The apparatus as claimed in claim 19, in which the computer and visual display unit are a stand alone system.

21. The apparatus as claimed in claim 19, in which the computer and visual display unit are part of an overall computer system which controls and operates processing equipment.

* * * * *